Figure 1:
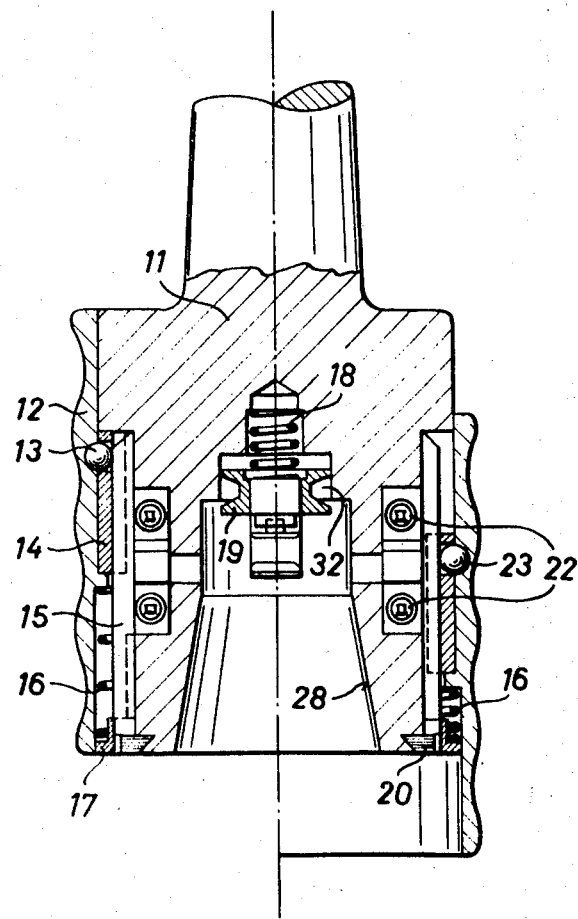

United States Patent

[11] 3,612,552

| [72] | Inventor | Paul Brundler |
| | | Hinterbergstrasse, Galgenen, Switzerland |
| [21] | Appl. No. | 849,670 |
| [22] | Filed | Aug. 13, 1969 |
| [45] | Patented | Oct. 12, 1971 |
| [32] | Priority | Aug. 21, 1968 |
| [33] | | Switzerland |
| [31] | | 12 565/68 |

[54] QUICK CHANGE TOOL HOLDER
7 Claims, 6 Drawing Figs.

[52] U.S. Cl. .................................................. 279/1 B,
279/90
[51] Int. Cl. ...................................................... B23b 31/12
[50] Field of Search .......................................... 279/89, 90,
91, 1 B, 76, 82

[56]                    References Cited
                  UNITED STATES PATENTS
1,856,973   5/1932   Smith .......................... 279/1 B 2,736,561    1956    Hansen ......................... 279/76 X
3,353,834   11/1967  Bay ............................. 279/82
3,498,624    3/1970  Hammond et al. ........... 279/89 X Primary Examiner—Andrew R. Juhasz
Assistant Examiner—James F. Coan
Attorney—Kenneth S. Goldfarb ABSTRACT: A quick change tool holder is arranged for tool change without stopping the tool spindle. The holder receives an arbor, the latter being engaged by segmental members in the holder body which are moved radially apart by wedges operated by a sliding sleeve on the outside of the holder. The segments are held in a released position after removal of the arbor by means of pawls engaging catch pins on the segments. Nose parts of the pawls engage a grooved ring spring mounted in the holder body and displaced on insertion of the arbor so that the segments are released. Limb portions of the segments then engage mating surfaces on the arbor which initiate acceleration of the arbor to the spindle speed after which the limbs enter slots in the arbor to give a positive drive.

INVENTOR.
PAUL BRÜNDLER

INVENTOR.
PAUL BRÜNDLER

INVENTOR.
PAUL BRÜNDLER
BY
Kenneth S. Goldfarb

QUICK CHANGE TOOL HOLDER

The invention relates to a quick change tool holder to receive at least one interchangeable tool or tool arbor wherein the holder embodies a conical bore for receiving the tool or arbor provided with a coned part and the holder is provided with an outer operating sleeve displaceable in the axial direction.

Various forms of quick change tool holders are known but these are only intended for tool change when stationary.

The invention provides a solution of the problem of effecting tool change in machine tools with the spindle in rotation.

The invention relates to a tool holder which comprises a holder body provided with a conical bore for receiving the arbor which is provided with a mating coned part, an outer sleeve displaceable in the axial direction of the holder, tapered spreader means cooperating with the sleeve for radial displacement of spring-loaded retaining members, catch means to retain the retaining members in their spread apart position and a release member cooperating with the catch members to release them on inserting the arbor. Thereby it is possible to speed up the tool change and moreover to provide the conditions for automatic change.

Figure 2:
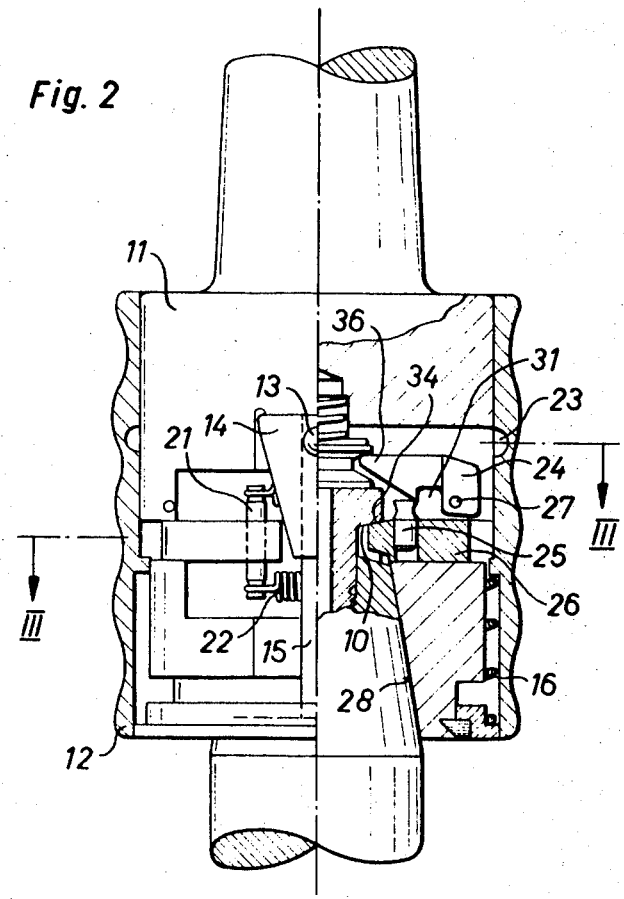
Figure 3:
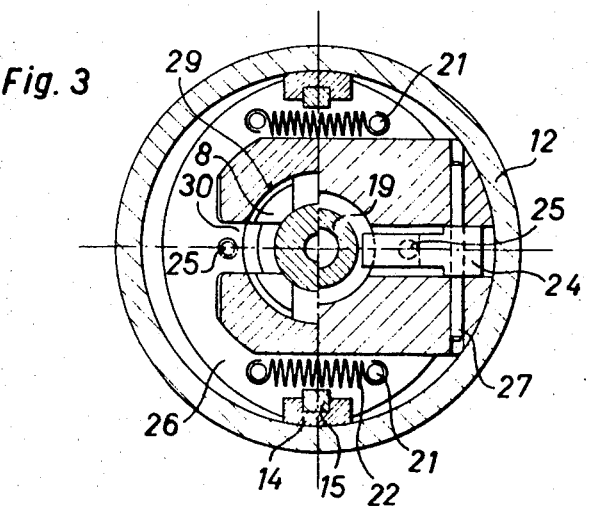
Figure 4:
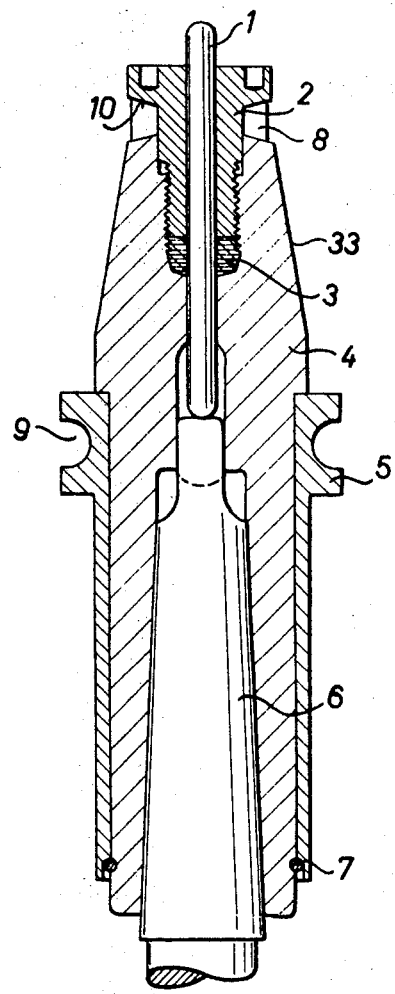
Figure 5:
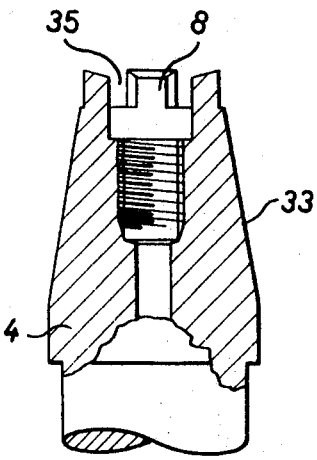
Figure 6:
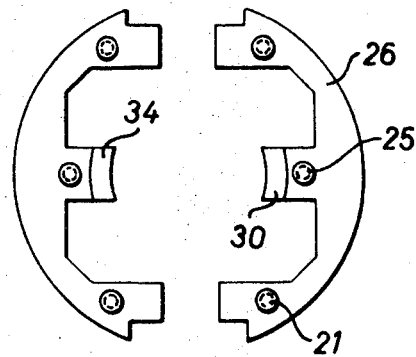

One constructional example of the invention is shown in the drawings in which:

FIG. 1 is a longitudinal section through the holder,
FIG. 2 is a longitudinal section through the holder at 90° to FIG. 1 in two different planes,
FIG. 3 is a cross section through the holder on the line III—III of FIG. 2,
FIG. 4 is a longitudinal section through the arbor with the tool in position,
FIG. 5 is a section through the upper part of the arbor, and
FIG. 6 is a plan of the clamp segments.

The quick change tool holder described below is intended for receiving an arbor such as is shown in FIGS. 4 and 5 although obviously it could be arranged for receiving a tool having an appropriate shank configuration rather than an arbor for receiving a separate tool.

The construction of the arbor will first be described. At the top of the arbor body 4 is an ejector pin 1 which is fitted into the bore of screw-threaded plug 2. At the base of the bore there is provided a rubber plug 3 in order to retain the ejector pin 1 by friction. The center and lower part of the arbor body 4 is surrounded by a holding sleeve 5 which is rotatable relatively to the arbor body 4 and is held from falling off by means of a safety ring 7 at the bottom. A ring groove 9 is provided for receiving grippers for automatic tool change purposes. The tool 6 proper is inserted in a tapered bore of the arbor body 4 and this tool is preferably provided with the usual Morse taper shank and is for example a drill, milling cutter or the like for chip removal metal cutting operations. The head of the arbor body 4 is provided with four driver lugs 8 the shape of which is shown in detail in FIG. 5 having slots or gaps 35 between them. The threaded plug 2 embodies an enlarged head part which incorporates an inclined clamp surface 10 the function of which will be described below.

The holder in which the arbor is fitted embodies a holder body 11 provided at the top with a taper shank in order that it can be inserted into the spindle of a machine tool such as a drilling machine, milling machine or the like. The holder body 11 is surrounded externally by a freely rotatable sleeve 12 so that this can be gripped by hand for tool changing and moved in the axial direction. Driver balls 13 run in a groove 23 in this sleeve 12 and cooperate with tapered wedge members 14 in such manner that these members can be moved up-and-down by means of the sleeve 12. The members 14 in turn are guided in the axial direction by respective guide ribs 15 so that the wedge members 14 execute an axial movement along the ribs. As shown on the left-hand side of FIG. 1 the sleeve 12 is pressed to the end position by means of a coil spring 16 supported at the bottom by means of a bearer ring 17. An ejector spring 18 is provided at the upper end of the body 11 in a bore 28, which cooperates with a release ring 19 so that this ring is displaceably supported in the axial direction. A three-part safety ring 20 is provided at the lower end of the holder body 11. The holder body 11 is provided at its lower face with a conical bore 28 which corresponds to a coned section 33 of the arbor.

Two retaining members comprise clamp segments 26 arranged as shown in FIG. 6 supported at the center part of the holder body 11 and radially displaceable. They are provided with spring-engaging pins 21 which extend upwardly and downwardly from the clamp segments 26 and in the axial direction of the holder. Catch means are provided for the segments 26; the said means comprise catch pins 25 inserted in the segments 26 the heads of which project above the upper surfaces of the clamp segments, and holder pawls 24 which are intended to cooperate with the respective catch pins 25. These holder pawls 24 are each pivotally supported on a pin 27 extending transversely to the rotary axis of the holder. The holder pawls 24 are each provided with a recess 31 in which the respective catch pin 25 can engage. On the other side these holder pawls 24 project by nose parts thereof into a groove 32 in the ring 19 so that these holder pawls 24 can be raised or lowered by axial movement of the ring 19 thereby to serve as a release member.

The two clamp segments 26 are each provided with mutually facing limbs 30 which are of tapered shape at the ends so that the upper inclined face 34 can cooperate with the inclined clamp surface 10 of the threaded plug 2 and thereby effect rotary coupling of the arbor during the change operation.

Thus the two clamp segments 26 are displaceable within the support body transversely to the rotary axis thereof and are drawn together by the springs 22. The limbs 30 of the two clamp segments 26 are so arranged and proportioned in width that they can engage in one of the slots or gaps 35 in the arbor head when coincident positions are reached.

Hereinafter the method of operation of this quick change tool holder is described wherein the arbor according to FIG. 4 is fitted to the holder shown in FIGS. 1 to 3.

First the sleeve 12 of the holder is pulled downwardly by hand (right-hand side of FIG. 1) whereby the two tapered wedge members 14 are pulled downwardly on the guide ribs 15 by means of the drive groove 23 and the balls 13. During this downward movement the tapered wedge members 14 force the two clamp segments 26 apart against the pressure of the springs 22. In the outermost spread apart position the catch pins 25 enter the recesses 31 since the pawls 24 tend to move downwardly under the pressure of the spring 18 and of the ring 19. Thereby the clamp segments 26 are retained in their spread apart position. The sleeve 12 can then be released whereby it and the wedge members 14 move back again to the starting position by the action of the spring 16. The driver limbs 30 of the clamp segments 26 are so far removed from one another that the arbor can be introduced from beneath.

It is assumed that the insertion of the arbor member is effected during the rotation of the holder. First the threaded plug 2 presses by its end face against the under side of the release ring 19 and moves it upwardly. this pushes the holder pawls 24 upwardly until the catch pins 25 are released from the depressions 31 so that the two clamp segments 26 are released and are drawn together in the radial direction by the action of the springs 22. Thereby the limbs 30 of the clamp segments 26 located at the center parts of these clamp segments 26 engage the inclined face 10 of the threaded plug 2. Since the pressure is comparatively great the inclined faces 34 start to drive the arbor which is thus rapidly accelerated.

The two clamp segments 26 move further together by the pull of the springs 22 and thus press the cone 33 more firmly into the conical bore 28 until finally the arbor operates almost at the same speed as the holder. As soon as this condition is reached and a slot or gap 35 lies opposite each limb 30 the latter enter the slots or gaps 35 and provide a synchronous slip-free drive connection. If the arbor is released too soon this cannot fall out since the limbs 30 are already positioned beneath the threaded plug 2 which is of larger diameter. By reason of the inclined surfaces 10 and 34 the cone 33 can in any event move somewhat further into the coned bore 28 after engagement so that a very rigid connection between the holder and the arbor is obtained and thus between the driving spindle and the tool. This construction ensures that the drive of the arbor is not taken up suddenly but that rigid connection is only obtained when the holder and arbor have reached almost the same speed.

The ejection of the arbor is effected in the opposite way to insertion in that first the sleeve 12 is pressed downwardly whereby the tapered wedge members 14 force the clamp segments 26 apart and thereby the limbs 30 are disengaged from the grooves 35 is that finally the arbor together with the tool secured in it can be pulled out downwardly and then a new arbor, for example with a different tool, can be inserted. In this way it is possible to effect tool change during the rotation of the spindle and obviously tool change can also be performed when the spindle of the machine is stopped.

I claim:

1. Quick change tool holder, comprising a holder body, an interchangeable tool arbor, a sleeve displaceable on the holder body against the action of a spring, oppositely disposed wedge means operatively coupled to the sleeve, ring segments radially displaceable within the holder body, gaps between the segments being operatively engaged with the wedge means for radial displacement of the ring segments on displacement of the sleeve, spring means tending to move the ring segments towards one another, projecting limbs on the ring segments operatively engageable with slots formed between upwardly projecting elements on the arbor to provide a positive drive between the arbor and the holder after the arbor has been inserted, a grooved ring axially supported within the holder body, spring means operating on said ring to press it into engagement with the arbor when inserted in the body, catch pawls pivotally supported in the holder body and having projecting parts engageable with the grooved ring, catch pins on the ring segments engageable with said pawls to hold the ring segments in a disengaged position when the arbor is absent and to release the ring segments on insertion of the arbor, and inclined cam surfaces on the limbs adapted to engage a mating surface of the arbor to initiate the drive of the arbor by the holder body.

2. A tool holder according to claim 1, wherein the arbor and the holder are provided with mating coned surfaces which are brought into driving engagement by cooperation of the inclined cam surfaces of the limbs with a correspondingly inclined surface associated with the arbor.

3. Quick change tool holder adapted to receive an interchangeable tool or tool arbor comprising a holder body provided with a conical bore for receiving the arbor which is provided with a mating coned part, an outer sleeve displaceable in the axial direction of the holder, tapered spreader means cooperating with the sleeve for radial displacement of spring-loaded retaining members, catch means to retain the retaining members in their spread apart position and a release member cooperating with catch members to release them on inserting the arbor, said retaining members being arranged as part-ring segments which are drawn together in the radial direction by springs, said spreader means extending between gaps of ring segments.

4. Quick change tool holder according to claim 3, said retaining members embodying limbs which engage slots in the head of the arbor, said limbs being provided with inclined engagement faces for driving the arbor and accelerating it to the spindle speed.

5. Quick change tool holder according to claim 3, characterized in that the catch means comprise pawl which are supported in the holder body about a pivot axis lying transversely to the rotary axis of the holder and which are adapted to engage with retaining members or to be disengaged therefrom.

6. A quick change tool holder according to claim 3, wherein said retaining members embody inclined surfaces to cooperate with an inclined surface provided in the head of the arbor.

7. Quick change tool holder according to claim 3, and a tool arbor, said arbor embodying at least two upwardly open slots and a threaded plug is inserted in a central bore of the arbor which plug embodies an inclined surface projecting over the slots.